UNITED STATES PATENT OFFICE.

LUDWIG SENSBURG, OF MUNICH, GERMANY.

MEDICATED BOUGIE.

No. 862,763.  Specification of Letters Patent.  Patented Aug. 6, 1907.

Application filed March 28, 1907. Serial No. 365,151.

*To all whom it may concern:*

Be it known that I, LUDWIG SENSBURG, a citizen of Germany, residing at Munich, Bavaria, Germany, have invented certain new and useful Improvements in Medicated Bougies; and I do hereby declare the following to be a full, clear, and exact description of the invention, such as will enable others skilled in the art to which it appertains to make and use the same.

In the treatment of complaints of the urinary and sexual organs, of the eyes, ears, jaws, teeth, of the nose and the intestinal organs it is of the greatest importance that the medicaments used in each case should act upon the diseased part as long as possible.

The method heretofore generally adopted, namely, to apply the remedies in the form of powders, solutions, ointments, melting-plugs and the like, has the disadvantage that the secretions of the organs under treatment or the warmth of the body or both together will soon dissolve or melt the medicament and wash it away, thereby greatly shortening the time of application.

The present invention relates to an improvement in the application of remedial compounds which will insure a sufficiently long local action of the medicaments in treating complaints of the mucous membrane and of the underlying tissues. To attain this object the medicaments are embedded in a suitable insoluble mass and are given certain outward forms differing according to the organ for which they are intended. This mass is composed of such materials that it will become softer under the action of the heat of the body but will not melt altogether, and consists, for instance, of gutta-percha, wax, resinous substances, stearin (the glycerid of stearic acid or a mixture of free fatty acids), paraffin and the like, or mixtures of these substances. The essential point of the present invention is, however, the molding of these substances, after the addition of suitable remedial ingredients, to shapes conforming with the shapes of the organs under treatment, thereby fulfilling the requirements of a rational cure.

The mass may be applied alone or in conjunction with a suitable support or frame, which latter may be composed of wood, metal, india-rubber or the like, or of some woven material.

Medical compounds prepared according to this method are especially suitable for treating complaints of the eyes and of the urethra. For application to the eyes, for instance, the mass is formed into disks, plates, rings or strips; and in the case of the urethra, plugs, thin rods and the like will be the best forms for application. For treating other organs, for instance, the intestines or the nose, the mass will in each case be molded in conformity with the shape of the organ under treatment or the diseased part.

Compared with powdered masses and with masses in which the medicament is embedded in insoluble but permeable in different material, and further compared with the well-known melting-plugs and the like, these new preparations have the advantage of unchangeableness of position and greatest possible immutability of shape after their application to the organ under treatment.

During use the warmth of the body and the secretions of the mucous membrane, the glands, etc., gradually dissolve the remedial ingredients out of the mass of these new preparations, thereby insuring an efficient action of the medicaments on the affected parts which extends to several hours.

As remedial ingredients of the mass all medicaments suited for treating complaints of the urinary and sexual organs, the eyes, ears, jaw, teeth, the nose and intestines may be used. For instance, when treating the urethra with sulfate of zinc, the mass may be composed of 30 parts of colophony, 3 parts of stearin and 2 parts of caoutchouc. These stuffs are melted together and to this mass is then added 3 parts of finely powdered sulfate of zinc. From this mass thin rods may be formed, suitable for insertion in the urethra.

What I claim as my invention and desire to secure by Letters Patent is:

1. A bougie comprising a shaped mass consisting of an intimate mixture of colophony, stearin and caoutchouc having a medicament intimately incorporated therein in substantially the proportions described.

2. A bougie comprising a shaped mass consisting of an intimate mixture of colophony, stearin, caoutchouc, and sulfate of zinc in substantially the described proportions.

In testimony whereof I hereunto affix my signature in the presence of two witnesses.

LUDWIG SENSBURG.

Witnesses:
ABRAHAM SCHLENNGER,
LOUIS MULLER.